United States Patent
Hudson et al.

(10) Patent No.: US 9,826,722 B2
(45) Date of Patent: Nov. 28, 2017

(54) AQUARIUM FILTER CONTAINING A CARTRIDGE CLOG INDICATOR

(71) Applicant: CENTRAL GARDEN & PET COMPANY, Walnut Creek, CA (US)

(72) Inventors: Andy Hudson, Oak Creek, WI (US); Brad L. Mihlbauer, Mukwonago, WI (US); Scott Rabe, Kansasville, WI (US); Mark Agresta, Franklin, WI (US); Yu Feng, Dongguan (CN)

(73) Assignee: CENTRAL GARDEN & PET COMPANY, Walnut Creek, CA (US)

( * ) Notice: Subject to any disclaimer, the term of this patent is extended or adjusted under 35 U.S.C. 154(b) by 131 days.

(21) Appl. No.: 14/505,800

(22) Filed: Oct. 3, 2014

(65) Prior Publication Data

US 2015/0096943 A1    Apr. 9, 2015

Related U.S. Application Data

(60) Provisional application No. 61/886,917, filed on Oct. 4, 2013.

(51) Int. Cl.
*A01K 63/04* (2006.01)
*C02F 1/00* (2006.01)

(52) U.S. Cl.
CPC ............ *A01K 63/045* (2013.01); *C02F 1/001* (2013.01); *C02F 2201/006* (2013.01); *C02F 2209/40* (2013.01); *C02F 2209/445* (2013.01)

(58) Field of Classification Search
CPC ............... A01K 63/045; C02F 2209/40; C02F 2201/006; C02F 2209/445
USPC .......... 210/87, 167.21, 167.22, 167.27, 767; 119/259, 260
See application file for complete search history.

(56) References Cited

U.S. PATENT DOCUMENTS

| | | | | |
|---|---|---|---|---|
| 3,525,435 A | * | 8/1970 | Conner, Jr. .......... | A01K 63/045 210/167.25 |
| 3,746,168 A | | 7/1973 | Willinger et al. | |
| 3,746,169 A | | 7/1973 | Willinger et al. | |
| 4,285,813 A | | 8/1981 | Stewart et al. | |
| 4,842,727 A | * | 6/1989 | Willinger ............. | A01K 63/045 137/563 |
| 4,985,181 A | * | 1/1991 | Strada ................... | A01K 63/047 119/259 |
| 5,062,950 A | * | 11/1991 | Shieh ................... | B01D 35/143 119/259 |
| 5,246,571 A | | 9/1993 | Woltmann | |
| 5,397,463 A | * | 3/1995 | Woltmann ........... | A01K 63/045 119/260 |
| 5,603,831 A | * | 2/1997 | Hickok ................ | A01K 63/047 119/260 |
| 5,965,016 A | * | 10/1999 | Suchowski .......... | A01K 63/045 119/260 |
| 7,488,417 B2 | | 2/2009 | Chauquet et al. | |

(Continued)

*Primary Examiner* — Fred Prince
(74) *Attorney, Agent, or Firm* — Grossman, Tucker, Perreault & Pfleger, PLLC

(57) ABSTRACT

An aquarium filter and a method of indicating reduced flow through the filter. The aquarium filter includes a first chamber, a second chamber, and a filter cartridge separating the first chamber and the second chamber. A first flow path is defined through the filter cartridge separating the first chamber and the second chamber. The aquarium filter also includes spillway defining a second flow path and an indicator positioned in the second flow path.

6 Claims, 10 Drawing Sheets

(56) References Cited

U.S. PATENT DOCUMENTS

| | | |
|---|---|---|
| 7,513,991 B1 | 4/2009 | Willinger |
| 2006/0060514 A1 | 3/2006 | Chauquet et al. |
| 2006/0102542 A1 | 5/2006 | Carley et al. |

\* cited by examiner

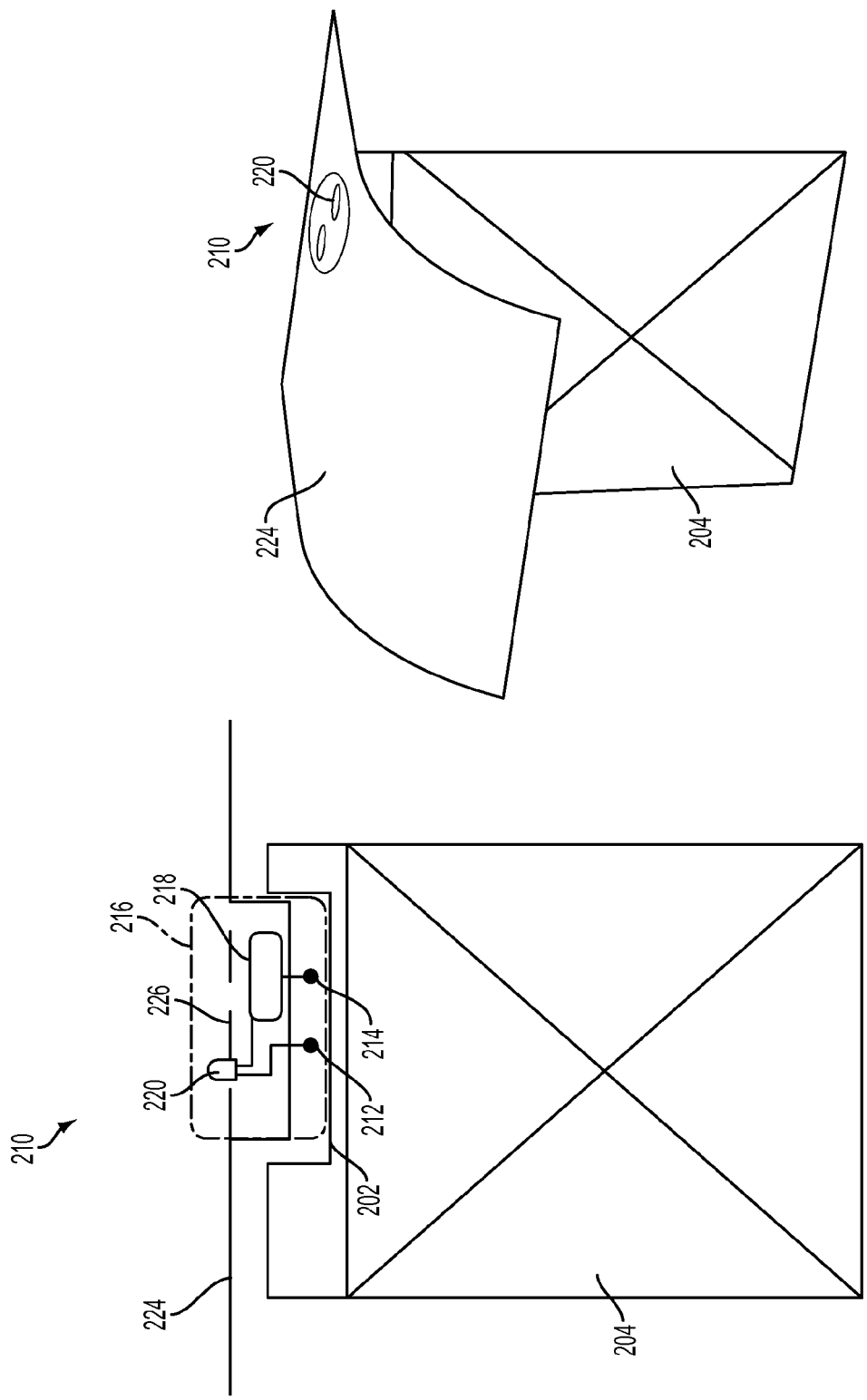

AQUARIUM FILTER CONTAINING A CARTRIDGE CLOG INDICATOR

CROSS-REFERENCE TO RELATED APPLICATIONS

The present application claims the benefit of the filing date of U.S. Provisional Application Ser. No. 61/886,917 filed on Oct. 4, 2013, the teachings of which are incorporated herein by reference.

FIELD

The present disclosure is directed to an aquarium filter with a clog indicator. More specifically, an aquarium filter is provider wherein reduced filtration efficiency is indicated allowing for a more efficient determination of flow reduction.

BACKGROUND

Aquariums often include filters to remove waste matter including detritus, excess food, free-floating particulate and chemicals from the water. Commonly, filters are mounted over the side of an aquarium; however, other arrangements may be provided where filters are submersed in the tank or free standing. Filters displace water laden with waste matter from the tank and direct it to a filter element. Most of the waste matter is removed from the water as the water passes through the filter element. The water then circulates back into the tank. Optionally, the water may be aerated prior to re-entering the tank.

Often a filter element is designed to mechanically remove the waste matter from the aquarium. When a filter element becomes clogged, water cannot pass through the filter and bypasses around the filter element. The filter element must then be cleaned or replaced to ensure that water is being filtered as it passes through the aquarium filter. However, filter elements are generally concealed within a filter housing. Although the housing improves the aesthetics of the filter, it does not allow the casual observer to notice when the filter element has become clogged with waste matter.

Mechanical indicators have been used to indicate rising water levels or the flow of water through the filtration system. However, such mechanical indicators may get stuck or fouled with debris. Other indicators, such as timers, do not necessarily reflect the actual efficiency of the filter, but just predict efficiency. Accordingly, room remains for improvement in indicating filtration efficiency.

SUMMARY

An aspect of the present disclosure relates to an aquarium filter. The aquarium filter includes a first chamber, a second chamber, and a filter cartridge separating the first chamber and the second chamber. A first flow path is defined through the filter cartridge separating the first chamber and the second chamber. The aquarium filter also includes spillway defining a second flow path and an indicator positioned in the second flow path.

Another aspect of the present disclosure relates to a method of indicating reduced flow through a filter cartridge. The method includes receiving water including waste matter in a first chamber of a filter. In addition to the first chamber, the filter also includes a second chamber, a filter cartridge separating the first chamber from the second chamber, a first flow path formed between the first chamber and the second chamber, a spillway forming a second flow path, and an indicator provided in the second flow path. A portion of the water is displaced from the first chamber through the second flow path and impinges against the indicator, wherein the indicator provides a visual indication of reduced flow through the filter cartridge.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 4 illustrates a front view of an embodiment of a filter cartridge where the spillway is defined by the filter cartridge and an embodiment of an indicator mounted on the underside of the lid;

FIG. 5 illustrates a perspective view of an embodiment of a lid including the filter cartridge of FIG. 4;

DESCRIPTION

The present disclosure is directed to a filter for use in a tank, such as an aquarium, that includes an indicator of whether the filter element is clogged and that filtration quality has been reduced. The arrangement facilitates the function of the filter wherein the casual observer can quickly see when the filter element has become clogged by the activation of an indicator in the aquarium filter lid. The arrangement exhibits particular utility when the filter cartridge is not visible or difficult to inspect from the exterior of the filter.

When the filter element becomes clogged, the water flow rate through the filter elements is reduced, even though the amount of water directed into the filter remains the same. This causes the water level in the filter to rise until water bypasses the filter element through a spillway located near or at the top of the filter cartridge. The spillway therefore provides a second flow path for the water. As water flows through the second flow path, the water impinges on an indicator and the indictor indicates that the filter should be changed.

In one aspect, the water impinges on a capacitance sensor and circuitry detects the change in capacitance as water impinges on the sensor. The circuitry provides an indication to change the filter. After the filter element has been cleaned, the water returns to normal levels and no longer impinges on the capacitance sensor.

In another aspect, the water completes a circuit between a power source such as a battery, two contacts, and a light indicator, indicating that it is necessary or desirable to replace or clean the filter element. After the filter element has been cleaned or changed, the water flow will return to flowing normally through the filter element and will not pass through the spillway, opening the circuit and deactivating the light indicator.

Figure 1:
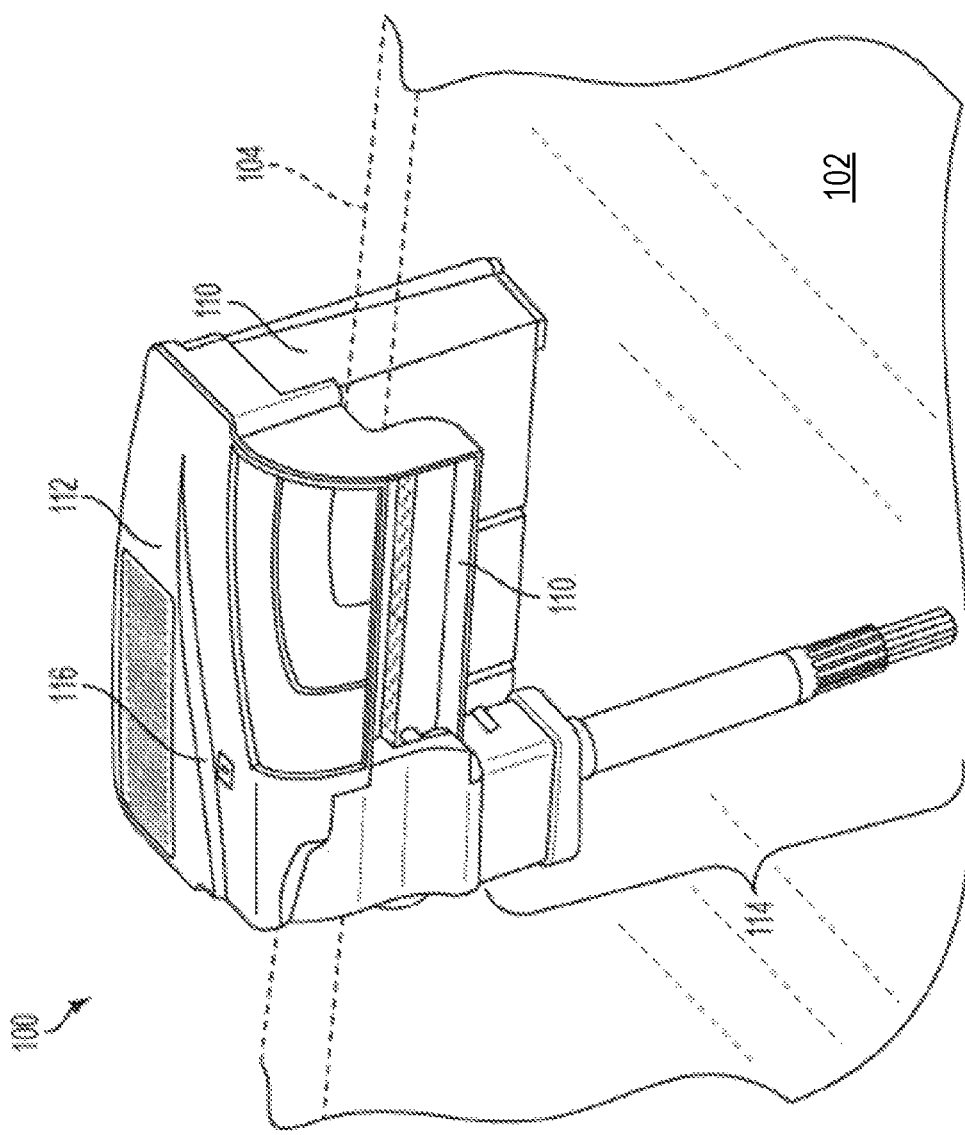
FIG. 1 illustrates a front perspective view an embodiment of an aquarium filter that is mountable over a tank wall.

FIG. 1 illustrates an embodiment of the aquarium filter 100 mounted over the wall 102 of an aquarium tank 104. The filter 100 includes a filter housing 110 and a filter housing lid 112. In addition, a water pump assembly 114 is provided. An indicator 116 of the ability of water to flow through the filter cartridge is also provided in the filter lid 104. Filtered water leaves the filter through a return 118. In particular embodiments, the flow rate of the water through the filter cartridge is at least the flow rate of the water introduced into the filter.

Figure 2A:
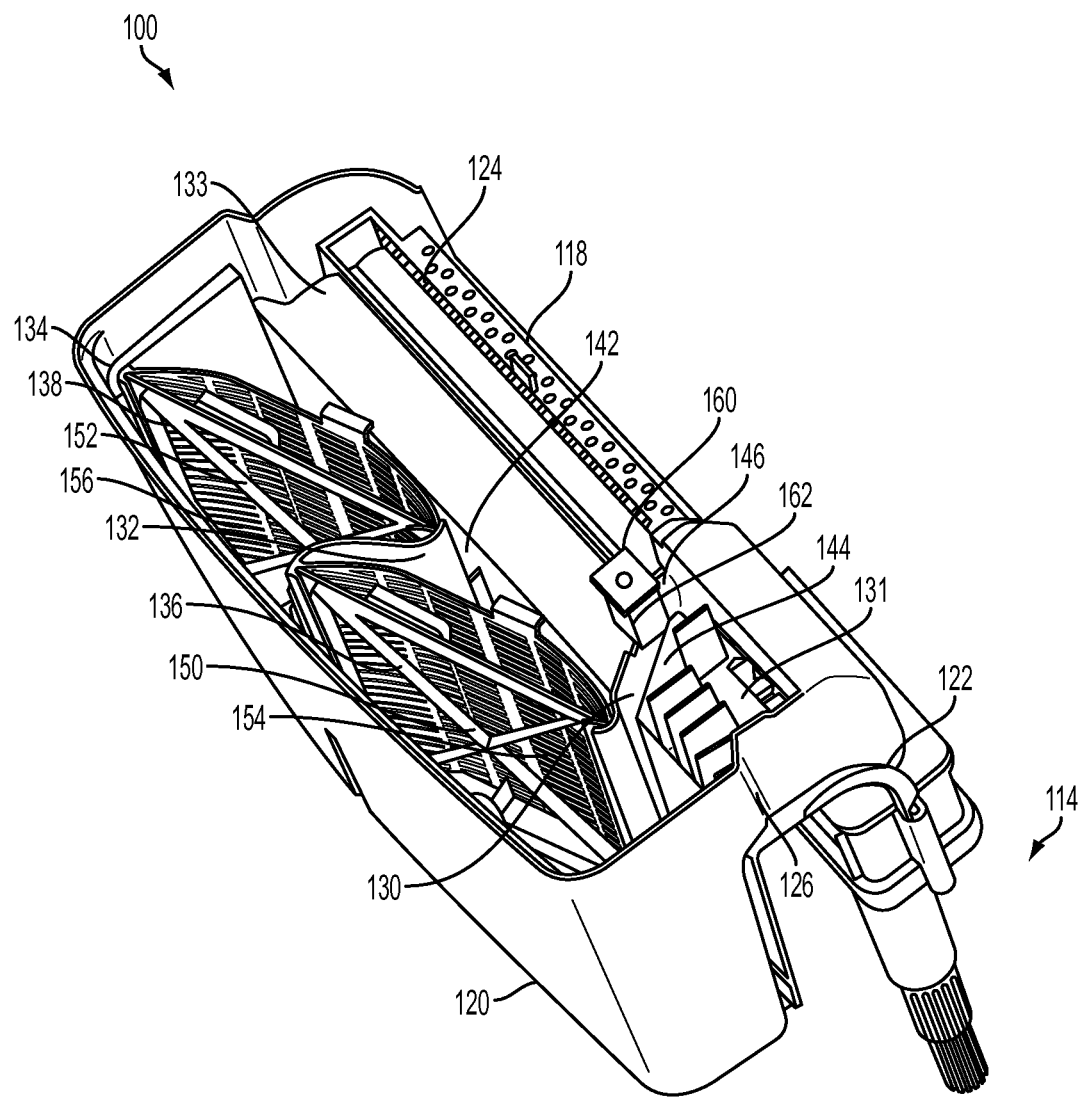
FIG. 2A illustrates a back perspective view of the filter of FIG. 1 with the filter lid removed.
Figure 2B:
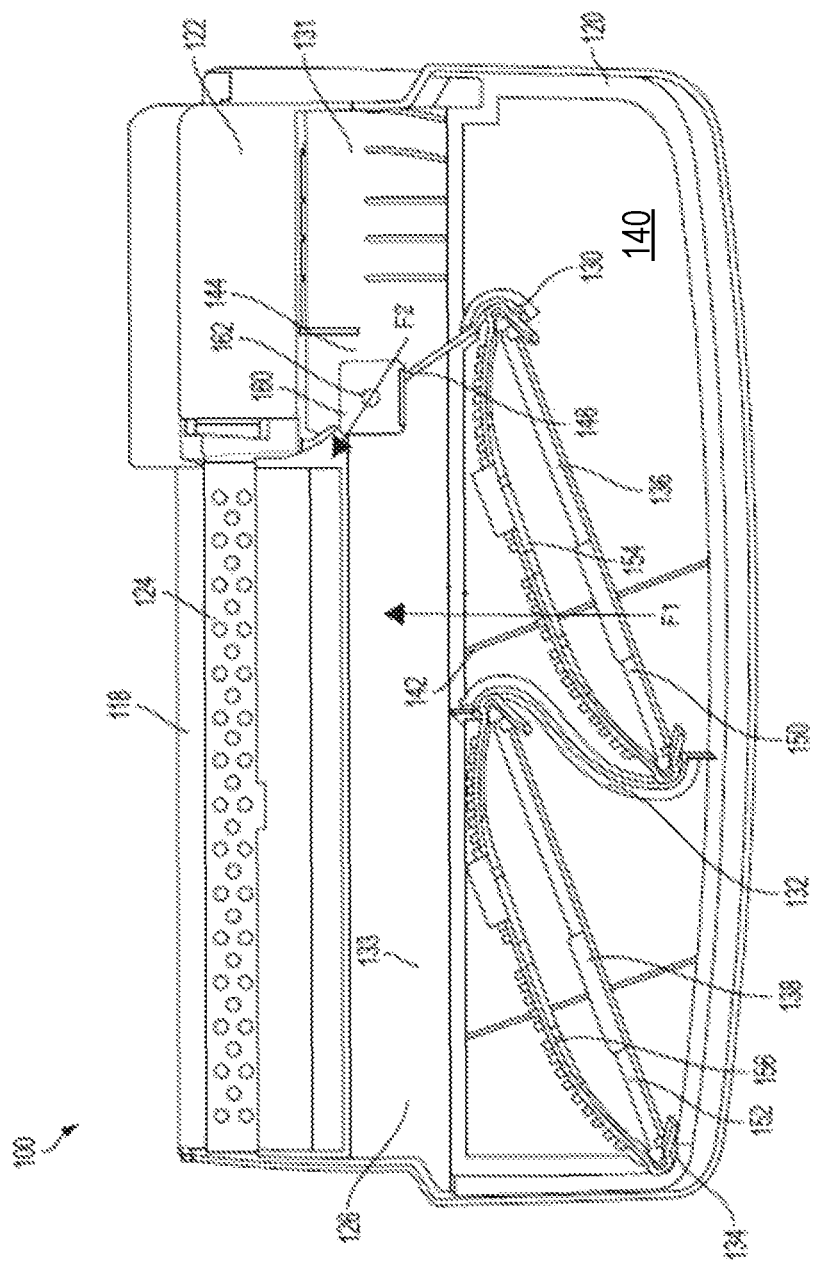
FIG. 2B illustrates a top view of the filter of FIG. 2A.

FIGS. 2A and 2B illustrate the filter 100 of FIG. 1 with the lid removed. As illustrated, the filter housing 110 includes three portions. A first portion 120 that is located on the exterior of the aquarium tank in which the filter cartridges are placed. A second portion 122 is located on the interior side of the aquarium tank to which the water pump assembly 114 and the optional aerator 124 are mounted. A third portion 126 bridges the first and second portions 120, 122 and rests on the tank wall 102.

FIGS. 2A and 2B also illustrate cartridge retention walls 130, 132, 134 defined in the first portion 120 of the filter housing. Walls 130 and 134 extend from the sides and, optionally, from the bottom of the filter housing, and wall 132 extends from the bottom of the filter housing. Cartridge retention walls 130, 132, 134 hold the filter cartridges 136, 138 in place and prevent water from flowing around the cartridges. Accordingly, the cartridge retention walls 130, 132, 134 and filter elements 136, 138 form a first chamber 140, a pre-filtration chamber, and a second chamber 142, a post filtration chamber, in the filter. In addition, cartridge retention wall 130 divides the third portion 126 of the filter housing into an inflow region 131 and an outflow region 133. Water, including waste matter, is displaced from the tank into the filter by water pump assembly 114 and flows over the inflow 131. The water then enters the first chamber 140, passes through the filter elements, and enters the second chamber 142, providing a first flow path F1 through the filter. As alluded to above, waste matter may include detritus, excess food, free-floating particles and chemicals in the water.

Further, the cartridge retention wall 130 forms a channel 144 that provides a spillway from the inflow 131 to the outflow 133, allowing water to pass around the filter cartridges 136, 138 when the water level rises. The depth of the channel 144 is lower than the top of the filter elements, and is particularly lower than the top of the filtering portion of the filter element where additional features are provided on the filter element such as tabs to raise and lower the filter element and/or filter cartridge out of the filter. Channel 144 also includes a "u-shaped" outlet 146, again the outlet 146 being lower than the top of the filter elements. This allows the water to flow through the spillway before the water level rises above the filter elements. This spillway forms a second flow path F2 through the filter. The channel depth, remaining portion of the inflow region 131 and the outflow region 133 may all be below the top of the filter elements and, particularly, lower than the top of the filter portion of the filter element when the filter element includes additional features such as tabs to raise and lower the filter element into the filter.

While two filter cartridges are illustrated, one cartridge, three cartridges, four cartridges or more cartridges may be present. The filter cartridges 136, 138 may each include a frame 150, 152 and a filter element 154, 156. As illustrated, the filter cartridges 136, 138 are generally not visible from the exterior of the filter. The filter cartridges may be disposable or, alternatively, reusable. Further, the filter cartridges may be formed of a porous material, such as woven or non-woven media, which may include additives, such as charcoal.

Figure 3A:
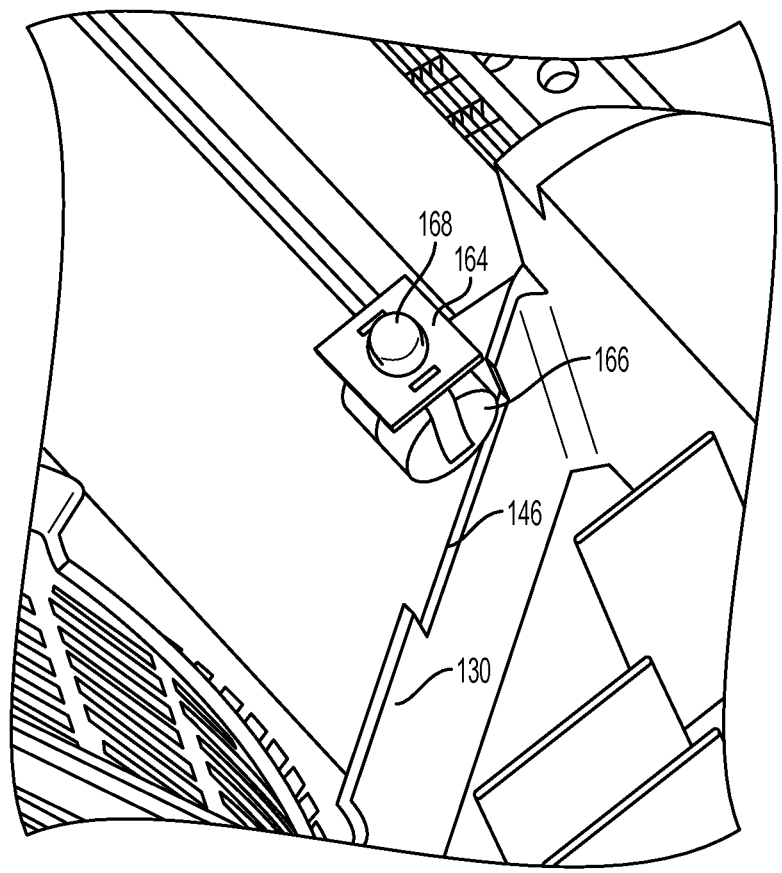
FIG. 3A illustrates a back perspective view of an embodiment of an indicator.

FIGS. 2A and 2B also illustrate an indicator 160 as positioned relative to the filter elements. As seen in FIGS. 2A and 2B, the indicator 160 is located in the spillway as defined, in this embodiment, by channel 144. However, the indicator 160 may be located from the filter elements 136, 138 to the return 118. The indicator 160 includes a battery housing 162, which holds the batteries relative to the circuitry. FIG. 3A illustrates the indicator 160 with the housing 162 removed. As illustrated, the indicator includes circuitry including a capacitance sensor 164, a printed circuit board including an integrated circuit having one or more processors thereon, a power source 166, and an indicator light 168.

The power source 166, as illustrated, includes two LR44 batteries; however, other batteries or power sources may be utilized. For example, the power source may include a battery having a voltage of 10 V or less, including all values and ranges from 1 V to 10 V, and preferably a voltage of 1.5 V. The battery is selected from, for example, a silver oxide battery, a zinc battery, a lithium battery, an alkaline battery, etc. In particular embodiments, the battery is a button cell. In embodiments, the battery is a replaceable battery or, alternatively, a non-replaceable battery. Furthermore, additional or alternative power sources, such as solar cells or household current, is used.

The indicator light 168 is illustrated as an LED; however, other light sources may be used and more than one indicator light may be present, such as two, three, four or more light indicators may be present. In embodiments, a single light indicator may be activated, i.e., turned on, when the circuitry has detected that the filter elements are clogged or the indicator light may be deactivated when the circuitry has detected that the filter elements are clogged. In other embodiments, a first indicator may be activated when the circuitry does not detect that the filter elements are clogged, and a second indicator may be activated when the circuitry detects that the filter elements are clogged. Various colors may be used for the indicator light, such as red, blue, green, etc.

Figure 3B:
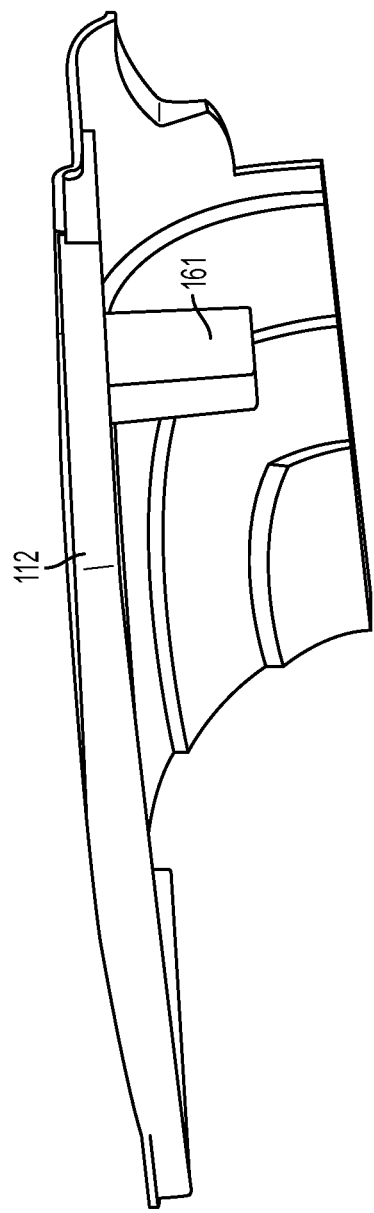
FIG. 3B illustrates a bottom perspective view of an embodiment of a lid including a compartment for an indicator.

The indicator may be housed inside a water-tight compartment 161 formed in the lid 112 as seen in FIG. 3B. The compartment may extend from the bottom of the lid 112. Sufficient clearance may be provided between the compartment 161 and the u-shaped outlet 146 to allow water to escape through the second flow path F2.

In operation, water, including waste, is brought into the filter through the water pump assembly 114. The water is then directed over the inflow region 131 of the third portion 126 of the filter housing and into the first chamber of the 140 of the filter housing 120. The water follows the first flow path F1, through the filter elements 154, 156 into the second chamber 142. As the filter element 154, 156 becomes clogged, the water level in the first chamber 140 may rise and eventually follow through a second flow path F2 via the spillway formed by channel 144 and outlet 146. Water may then impinge the indicator 160, altering the capacitance of the capacitance sensor, which may then be detected by the circuitry 164. The circuitry 164 may then turn the light indicator 168 on to indicate that the filter elements 154, 156 are clogged.

FIG. 4 illustrates another embodiment of a filter cartridge and indicator. In this embodiment, the spillway is formed by a channel 202 formed in the filter cartridge 204, which may be used in the filter housing described above. Again, the filter cartridge 204 is not visible from the exterior of the filter and the filter cartridge is disposable or, alternatively, reusable. As in the embodiment above, the filter cartridge forms two chambers within the filter, a first chamber, or prefiltration chamber, and a second chamber, or post-filtration chamber. The filter cartridge 204 includes a channel 202 forming a spillway. As illustrated, the spillway is defined in the top wall of the filter cartridge. However, in other embodiments, the spillway may be defined in a side wall of the filter cartridge near the top of the cartridge. Furthermore, while the spillway is illustrated as being open on one side taking on the form of an open channel, in embodiments, the spillway may be an opening through the filter cartridge, wherein the opening is surrounded on all sides by the filter cartridge and is a closed channel. Regardless, the bottom of the spillway may be lower than the top of the filter element as in the previous embodiment of FIGS. 1 through 3. In embodiments, the filter cartridge includes a filter element and a filter element frame as seen in the embodiment of FIGS. 2A and 2B. The spillway is defined in the filter element, the filter element frame, or both the filter element and the filter element frame as seen in FIG. 4.

FIG. 4 also illustrates another embodiment of an indicator 210 mounted to the underside of the filter lid 224. Positioned within the spillway are at least two power contacts 212, 214, such as wire leads. The power contacts 212, 214 form a portion of circuitry 216 such as an integrated circuit with one or more processors mounted thereon that also includes a power source 218 and the light indicator 220. Similar to the above, the light includes a light emitting diode (or LED), which operates in the range of 20 to 60 milliwatts, including all values and ranges therein. Light indicators of one or more colors are employed. In particular embodiments, where more than one light indicator of different colors are employed, the various colors may indicate the degree of spill over.

As illustrated in FIG. 5, which illustrates the filter cartridge 204 relative to the filter lid 224, the light indicator extends through the filter lid 224, or alternatively, the light indicator is visible in an opening 226 or through the filter lid. For example, the filter lid may include a clear window or cover through which the light indicator is visible. The cover is formed, in embodiments, from a polymeric material such as acrylic.

Referring again to FIG. 4, the power source includes a battery having a voltage of 10 V or less, including all values and ranges from 1 V to 10 V, and preferably a voltage of 1.5 V. The battery is selected from, for example, a silver oxide battery, a zinc battery, a lithium battery, an alkaline battery, etc. In particular embodiments, the battery is a button cell. In embodiments, the battery is a replaceable battery or, alternatively, a non-replaceable battery. Furthermore, additional or alternative power sources, such as solar cells or household current, is used.

Referring again to FIG. 4 and alluded to above, the circuitry 216 is mounted on the underside of the filter lid 224 and the contacts extend from the lid 224. However, in other embodiments, the circuitry may be mounted to the filter cartridge. And, in further embodiments, the circuitry may be mounted to other locations in the filter, provided that again the contacts are positioned near the spillway such that when water flows over the spillway, at least a portion of each the contact is impinged with or immersed in the flowing water.

In operation, when the filter cartridge becomes clogged, and water can no longer pass through the first flow path from the first chamber, through the filter element in the filter cartridge, to the second chamber at the flow rate at which water is introduced into the filter by the water pump assembly, water passes through the spillway and second flow path. At least a portion of the contacts become immersed in the water, completing the circuit including the power source and the light indicator, thus turning the light on to indicate that it is time to replace or clean the filter.

The indicator described in the embodiment of FIG. 4 may be used in the embodiment described in FIGS. 1 through 3 and vice versa where the indicator described in embodiments of FIGS. 1 through 3 may be used in the embodiment of FIG. 4. It may be appreciated that in utilizing the filter cartridge set forth in FIG. 4, it is not necessary to provide the channel 144 and "u-shaped" outlet 146 described in FIG. 2.

In another aspect, illustrated in FIGS. 6 through 10, the indicator includes a water wheel located in the spillway. When the filter element becomes clogged, the water bypasses the filter element and passes through the spillway. As water flows through the spillway, the water impinges on the water wheel and causes the water wheel to rotate. Rotation of the water wheel indicates the necessity or desirability of replacing or cleaning the filter element. After the filter element has been cleaned or changed, the water returns to its normal flow pathway through the filter and does not pass through the spillway, leaving the water wheel stationary.

Figure 6:
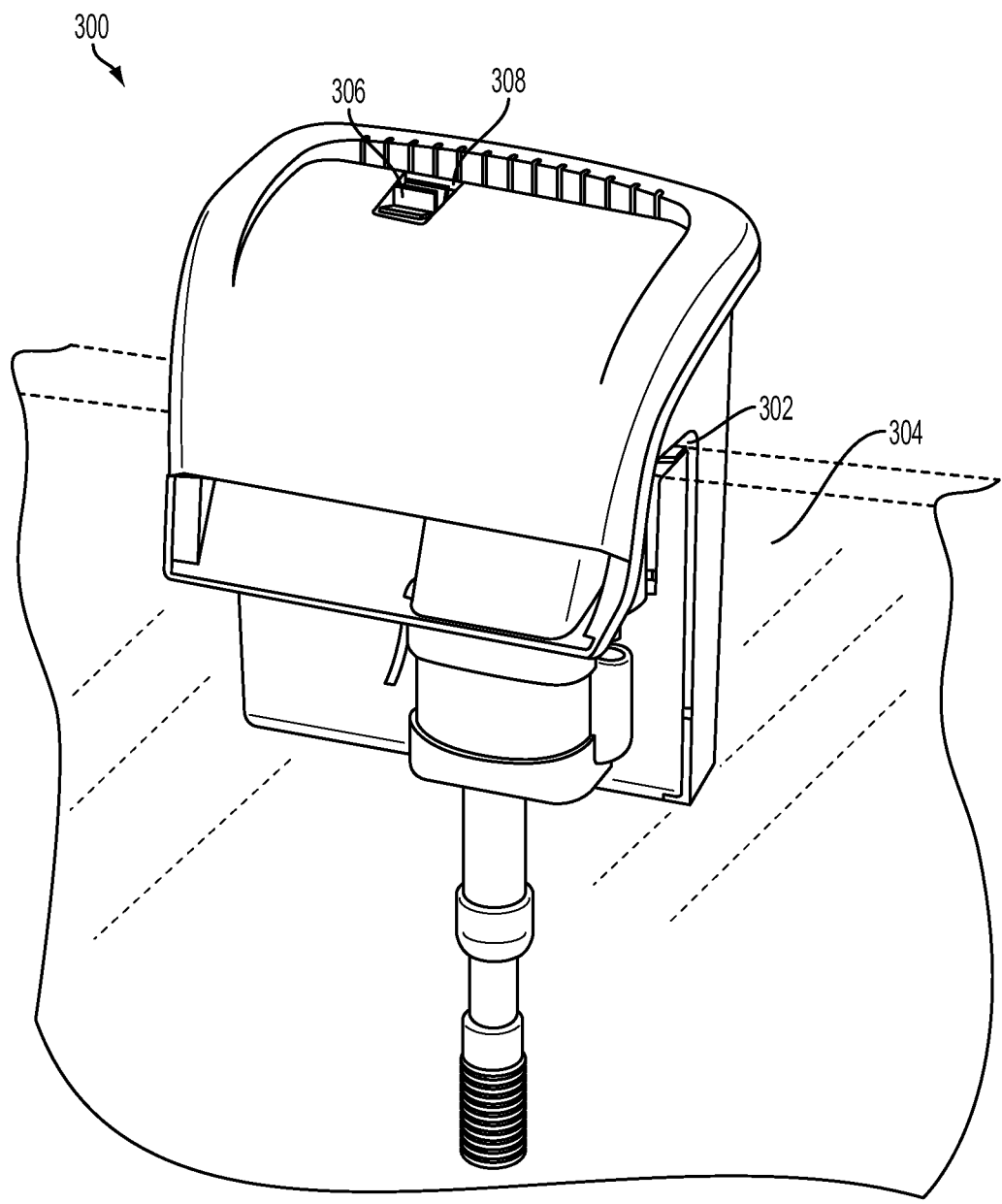
FIG. 6 illustrates a front perspective view of an embodiment of an aquarium filter mountable over a tank wall including a water wheel indicator.

FIG. 6 illustrates an embodiment of such a filter 300. As above, the illustrated filter is positionable over the wall 304 of an aquarium and, as in the previously described embodiments, includes a recess 302 for receiving a lip of the tank. The water wheel 306 is visible through an opening 308 in the filter lid 310. In embodiments, the blades of the water wheel exhibit one or more colors that are different than the colors of the filter lid to improve visibility of the cover.

Figure 7:
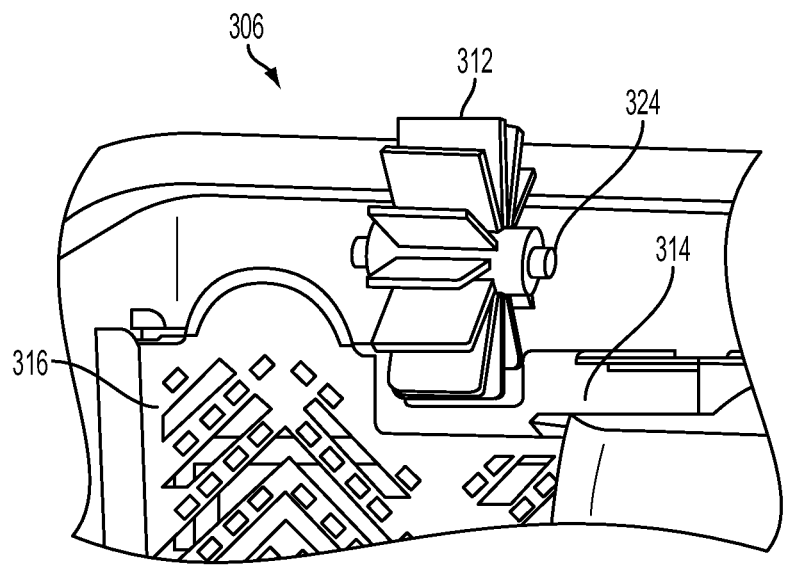
FIG. 7 illustrates an embodiment of a water wheel indicator.

As illustrated in FIG. 7, a portion of the blades 312 of the water wheel is positioned in the spillway 314, which is defined in the top of a filter cartridge 316. In other arrangements, the water wheel may be positioned such that the blades are impinged by water after the water has left the spillway. Or, the water wheel may be positioned such that the blades are impinged by the water as the water is entering the spillway.

Figure 8:
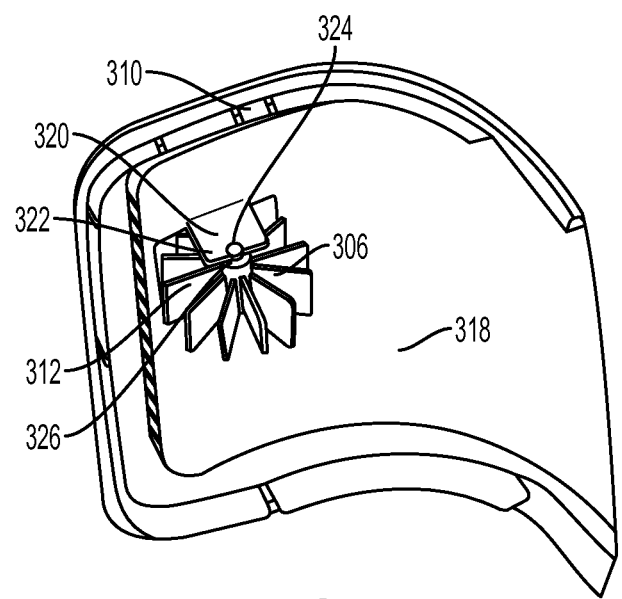
FIG. 8 illustrates an embodiment of the water wheel indicator of FIG. 7 mounted on the underside of a lid.

FIG. 8 illustrates the water wheel mounted on the underside of the filter lid. Two mounting arms 320 (only one is seen) extend from the underside 318 filter lid 310 and include a retaining hub 322 in which the spindle 324 of the water wheel 306 is inserted and retained. As illustrated, each retaining hub includes an opening 326 through which the spindle may be passed into the hub. In other embodiments, the mounting arms deflect, accommodating the length of the spindle. Alternatively, in embodiments, the water wheel may be mounted directly to the filter lid, omitting the mounting arms. In yet other embodiments, the water wheel may be mounted to the filter cartridge, yet remains visible in an opening in the filter lid.

Figure 9:
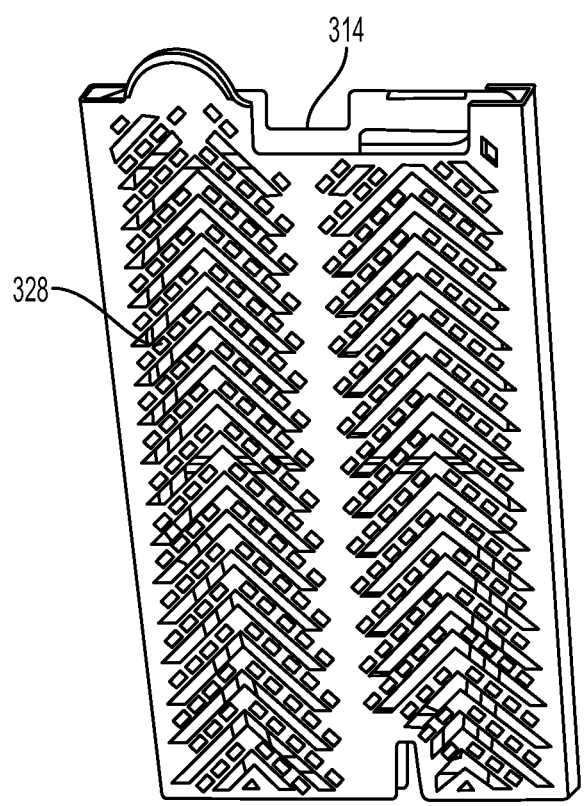
FIG. 9 illustrates an embodiment of a filter frame with a spillway defined therein.

FIG. 9 illustrates a spillway 314 defined in the filter element frame 328 of the filter cartridge. As noted above, the spillway 314 can be defined in the filter element frame, the filter element, or both the filter element housing and filter element. Again, while the spillway is illustrated as a channel, being open at the top, the spillway may alternatively be an opening defined in and through the filter cartridge. Furthermore, the spillway is alternatively positioned on either side of the cartridge near the upper portion of the cartridge.

Figure 10:
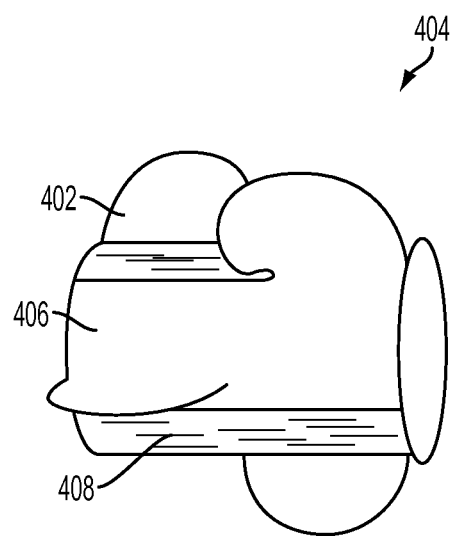
FIG. 10 illustrates an embodiment of a water wheel.

FIG. 10 illustrates another embodiment of a water wheel that may be used in the embodiment of FIGS. 6 through 9. The blades 402 of the water wheel 404 are positioned in an alternating manner along the length of the water wheel. The blades are illustrated as extending less than the entire length of the water wheel. As illustrated, portions of the water wheel spindle surface 406, 408 between the blades are assigned different colors. However, in alternative embodiments, the water wheel may include one, three, or more colors. In addition, in embodiments, different colors are provided on the surface of the water wheel blades.

In operation, as the water levels in the first chamber, i.e., the pre-filtration chamber, of the filter rise due to clogging of the filter and reduction in the amount of water that can travel through the first flow path, the water flows through a second flow path provided by the spillway. The water impinges against the blades of the water wheel, causing the water wheel to spin.

In a further aspect of the above, a combination of both the water wheel and light indicator circuitry is employed. The water wheel drives a generator, which is included in the indicator circuitry and provides the power source. The generator, positioned between the contacts, creates sufficient energy for powering the indicator light.

Accordingly, an aspect of the present disclosure relates to an aquarium filter. The aquarium filter includes a first chamber and a second chamber and a filter cartridge separating the two chambers. The filter cartridge includes a spillway through which water passes through when the filter cartridge becomes clogged with waste. The aquarium filter also includes indicator circuitry including a power source, at least two contacts leads, and a light indicator. In some embodiments, the filter indicates that the filter cartridge should be changed when water, flowing through a second flow path created by a spillway impinges on a capacitance sensor. In other embodiments, the light indicator is powered when water is flowing through the spillway in the filter cartridge, contacts at least a portion of the contacts and completes the electrical circuit. In particular embodiments, the light indicator is an LED. In addition, in embodiments of the above, the indicator includes two or more colors. Further, in embodiments of the above, the chambered aquarium filter includes a filter lid. The filter lid includes, for example, an opening or a clear plastic cover through which the light indicator is visible. In further embodiments of the above, the power source is a replaceable battery or, alternatively, a non-replaceable battery.

Another aspect of the present disclosure relates to an aquarium filter. The filter includes a first chamber a second chamber and a filter cartridge separating the two chambers. The filter cartridge includes a spillway through which water passes over when the filter cartridge becomes clogged with detritus. The aquarium filter also includes a water wheel indicator that rotates when water flows through the spillway. In embodiments, the water wheel includes at least two colors visible on the surface of the water wheel. In addition, in embodiments of the above, the indicator also includes indicator circuitry. The indicator circuitry comprises a light indicator and a generator coupled to the water wheel, wherein the generator powers the circuitry upon rotation of the water wheel.

A further aspect of the present disclosure relates to a method of indicating reduced flow through a filter cartridge in a filter, such as any of the above filters. The method includes receiving water including detritus in a first chamber of a filter, wherein the filter includes the first chamber, a second chamber and a filter cartridge separating the first chamber from the second chamber. The method also includes displacing the water from the first chamber into the second chamber through a spillway defined in the filter cartridge. The method further comprises impinging the water against an indicator, wherein the indicator provides a visual indication of reduced flow of water through the filter cartridge.

In embodiments of the above, the indicator includes indicator circuitry comprising at capacitance sensor, a light indicator and a power source, wherein impinging the sensor with the water powers the light indicator. In alternative embodiments of the above, the indicator includes indicator circuitry comprising at least two contacts, a light indicator and a power source, wherein impinging the contacts with the water powers the light indicator. In the use of circuitry, where there are no mechanical parts, the indicator is not prone to becoming stuck due to the buildup of matter.

Alternatively, in the embodiments of the above, the indicator includes a water wheel and the water wheel rotates when impinged with the water. In particular embodiments, the indicator further includes indicator circuitry comprising a light source and a generator connected to the light source and water wheel, wherein impinging the water wheel with water powers the light source.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of indicating reduced flow through a filter, comprising:
   receiving water including waste matter in the filter, the filter having an inlet and a return, wherein the filter includes:
   a first chamber and a second chamber;
   a filter cartridge separating the first chamber from the second chamber, wherein a first flow path extends between the inlet and the return of the filter and through said first chamber and said second chamber;
   a spillway defining a second flow path, the second flow path extending between the inlet and the return of the filter and bypassing the first and second chambers wherein the spillway includes an outlet, wherein the outlet is lower than the top of the filter elements; and
   an indicator provided in the second flow path;
   displacing a portion of the water from the first chamber through the second flow path; and
   impinging the portion of water against the indicator, wherein the indicator provides a visual indication of reduced flow through the filter cartridge.

2. The method of claim 1, wherein the portion of water impinges a sensor included in indicator circuitry, wherein said indicator circuitry further includes a light indicator and said method further comprises activating said light indicator.

3. The method of claim 1, wherein the indicator includes indicator circuitry comprising at least two contacts, a light indicator, and a power source, wherein impinging the contacts with the portion of water powers the light indicator.

4. The method of claim 1, wherein the indicator includes a water wheel and the water wheel rotates when impinged with the portion of water.

5. The method of claim 1, wherein the indicator further includes indicator circuitry including a light source and a generator connected to the light source and a water wheel, wherein impinging the water wheel with water powers the light source.

6. The method of claim 1, wherein the filter includes a filter housing and the spillway is defined by the filter housing.

* * * * *